United States Patent [19]

Belluck

[11] 3,750,174

[45] July 31, 1973

[54] AIDED ANGLE TRACKING DEVICE

[75] Inventor: Raymond E. Belluck, Flushing, N.Y.

[73] Assignee: The United States of America as represented by the Secretary of the Navy, Washington, D.C.

[22] Filed: Nov. 20, 1963

[21] Appl. No.: 325,189

[52] U.S. Cl. .................... 343/18 E, 343/7.4, 343/9
[51] Int. Cl. ............................................... G01s 9/02
[58] Field of Search ...................... 343/7, 7.4, 18, 9, 343/5, 100, 18 E; 325/183

Primary Examiner—Malcolm F. Hubler
Attorney—Q. B. Warner and R. F. Hossfeld

EXEMPLARY CLAIM

2. A method of tracking a target in the presence of enemy jamming which employs a radar tracker and comprises the steps of
 deriving from a radar receiver traverse and elevation components of an angular velocity signal representative of said target angular velocity with respect to said tracker immediately prior to enemy jamming of said tracker,
 applying said traverse and elevational components to a coordinate conversion means for converting said components into stabilized horizontal and vertical components of said angular velocity signal,
 vectorially summing said horizontal and vertical components,
 storing the vectorial sum and the time derivative thereof of said horizontal and vertical components in an integrating circuit,
 applying signals from said integrating circuit to a function generator for generating an angular rate signal W which satisfies the equation $$\ddot{W} = 3/2\ (\dot{W}^2/W) - 2\dot{W}^3$$

where $\ddot{W}$ represents the second time derivative of W
and $\dot{W}$ represents the first time derivative of W
 and applying said last-named signal to circuitry coupled to said radar tracker enabling said tracker to track at said last-named angular rate during enemy jamming.

8 Claims, 5 Drawing Figures $Z_s$ = CROSS TRAVERSE.
B = RELATIVE TARGET BEARING.
$B'_d$ = TARGET DECK BEARING.
E = TARGET ELEVATION.
$E'_d$ = TARGET DECK ELEVATION.

$W_t$ = TRAVERSE ANGULAR RATE.
$W_e$ = ELEVATION ANGULAR RATE.
$W_h$ = HORIZONAL ANGULAR RATE.
$W_v$ = VERTICAL ANGULAR RATE.

$Z_s$ = CROSS TRAVERSE.
$B$ = RELATIVE TARGET BEARING.
$B_d'$ = TARGET DECK BEARING.
$E$ = TARGET ELEVATION.
$E_d'$ = TARGET DECK ELEVATION.

$W_t$ = TRAVERSE ANGULAR RATE.
$W_e$ = ELEVATION ANGULAR RATE.
$W_h$ = HORIZONAL ANGULAR RATE.
$W_v$ = VERTICAL ANGULAR RATE.

INVENTOR.
Raymond E. Belluck

AIDED ANGLE TRACKING DEVICE

The present invention relates generally to radar control means for use in a radar system employed in a shipborne weapon system and more specifically to computer circuitry designed to improve the performance of a radar tracker in the presence of enemy countermeasures.

The control circuitry of the present invention provides a form of aided tracking which enables the tracking radar set to coast in angle at a predetermined angular velocity during the reception of jamming signals at the radar receiver or during a chaff environment when tracking, either passive or normal, may not be possible. The aided angle tracking program can be generated by the computer circuitry of the present invention even when target range data is denied at all times during the target engagement by the tracking radar set. In order to generate the aided angle tracking program, the only data required is that which relates to the angular motion of the target immediately prior to the cessation of normal tracking or the initial reception of the jamming signals at the radar receiver.

The desired program providing command signals at the radar tracker is computed automatically if the target moves in a straight line at a fixed speed. Provision may be made, however, for the radar operator to introduce commands which will modify this coast program in case of target maneuvers.

It is an object of the present invention to provide a new and improved aided angle tracking device for use in a radar system.

It is another object to provide control circuitry adapted for use with a radar set and which will enable the radar set to track, at a close approximation, the path of a moving target during the reception of jamming signals at the radar receiver.

A further object of the present invention is to provide a novel analog computer arrangement operating as a function generator for generating a control signal which will allow the radar tracker to coast in angle until after the cessation of jamming.

A still further object of the present invention is to provide an aided angle tracking system for a tracking radar set and which operates on a principle which would be applicable to any type of tracking radar.

Many other objects and attendant advantages of the present invention will become readily apparent from reading the following specification in connection with the accompanying drawing wherein.

Figure 1:
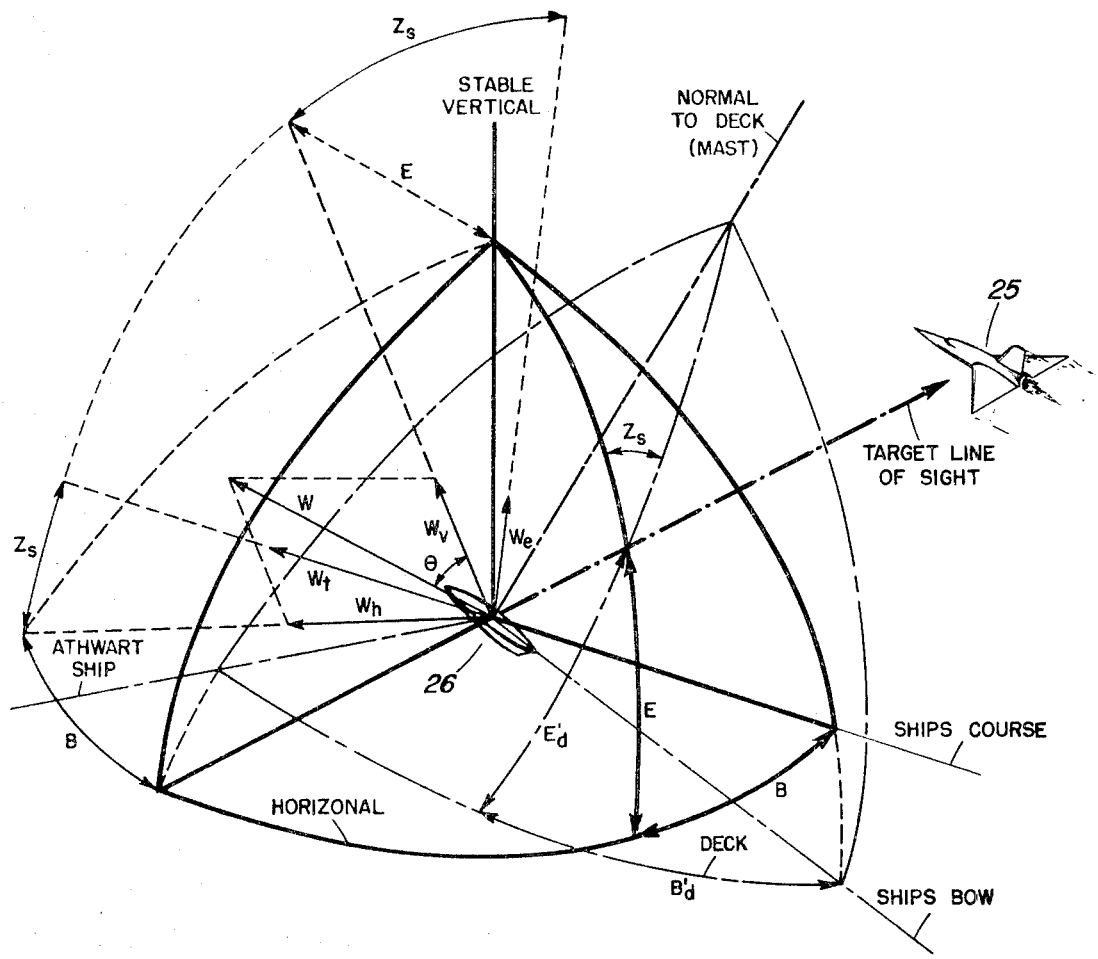
FIG. 1 is a spherical representation depicting target motion with respect to the tracking radar set.

The equations required by computer circuitry 24 to generate a program for aided tracking of a moving target are derived by assuming that target velocity will be constant during the reception of enemy jamming signals at the radar receiver 5. Referring to FIG. 1, the position of the target 25 relative to the ship 26 is defined by the vector $R = Rr$ where $R$ is the magnitude of the range from the ship 26 to the target 25, and $r$ is a unit vector directed along the target line of sight. The system's coordinates are illustrated in FIG. 1 where the various angular velocity vectors of the target with respect to the ship and the target bearing and elevation are listed separately.

The rate of change of $R$ in space is given by equation (1):

$$dR/dt = d(rR)/dt = r\,(dR/dt) + R(dr/dt)$$

(Eq. 1)

The target's acceleration with respect to the ship is given as the second derivative of $R$:

$$d^2(rR)/dt^2 = (d/dt)\,[r\,(dR/dt) + R\,(())] = r\,(d^2R/dt^2) + 2(dR/dt)\,(dr/dt) + R(d^2r/dt^2)$$

(Eq. 2)

The various terms of Equation 2 will be identified in detail as follows:

1. The quantity $dr/dt$ is the rate of change in direction of the unit vector $r$.

$$\frac{dr}{dt} = W \times R = \begin{vmatrix} t & r & e \\ W_t & W_r & W_e \\ 0 & 1 & 0 \end{vmatrix} = (eW_t - tW_e)$$

(Eq. 3)

where: $t$ is a unit vector in a plane perpendicular to $r$ and is directed along the traverse axis, and $W_r$, $W_t$ and $W_e$ are the vector components of the angular velocity of the target line of sight directed as illustrated in FIG. 1:

$e$ is a unit vector perpendicular to both $r$ and $t$ and is directed along the elevation axis.

$W$ is the total angular rate of rotation of the target line of sight.

$$W = W_t t + W_r r + W_e e$$

(Eq. 4)

2. The quantity $d^2r/dt^2$ is the rate of change in direction of $dr/dt$ $$d^2r/dt^2 = (d/dt)\,[dr/dt] = (d/dt)\,(W \times r) = (dW/dt) \times r + W = dr/dt$$

(Eq. 5)

a. The quantity $W \times \frac{dr}{dt}$ $$= (W_t t + W_r r + W_e e) \times (eW_t - tW_e)$$

$$= \begin{vmatrix} t & r & e \\ W_t & W_r & W_e \\ -W_e & 0 & W_t \end{vmatrix} = t(W_r W_t) - r(W_t^2 + W_e^2) + e(W_r W_e)$$

(Eq. 6A)

b. The quantity $\dfrac{dW}{dt} \times \underline{r} = \begin{vmatrix} \underline{t} & \underline{r} & \underline{e} \\ \dot{W}_t & \dot{W}_r & \dot{W}_e \\ 0 & 1 & 0 \end{vmatrix} = \underline{e}\dot{W}_t - \underline{t}\dot{W}_e$ (Eq. 6B)

where $\dot{W}$ represents the first time derivative of the target line of sight rotation.

Substituting equations 6A and 6B into Equation 5 yields the following:

$d^2r/dt^2 = \underline{t}(W_r W_t - \dot{W}_e) - \underline{r}(W_t{}^2 + W_e{}^2) + \underline{e}(W_r W_e + \dot{W}_t)$ (Eq. 7)

Combining Eq. (7) and Eq. (3) into Eq. (2) results in the following equation for the total acceleration of R in space.

$(d^2[\underline{r}R]/dt^2) = \underline{r}(\ddot{R} = R(W_t{}^2 + W_e{}^2))$
$+ \underline{t}(-R\dot{W}_e - 2\dot{R}W_e + RW_r W_t) + \underline{e}(R\dot{W}_t + 2\dot{R}W_t + RW_r W_e)$ (Eq. 8)

Since the target is assumed to move at a uniform velocity, the acceleration of R, $d^2R/dt^2$, is zero. The components of $d^2R/dt^2$ projected onto a set of mutually orthogonal axes must also be zero and are defined in Equations 9, 10 and 11.
Hence, $(d^2[\underline{r}R]/dt^2)|r = \ddot{R} - R(W_t{}^2 + W_e{}^2) = 0$ (Eq. 9)

$(d^2[\underline{r}R]/dt^2)|t = (-R\dot{W}_e - 2\dot{R}W_e + RW_r W_t) = 0$ (Eq. 10)

$(d^2[\underline{r}R]/dt^2)|e = (R\dot{W}_t + 2\dot{R}W_t + RW_r W_e) = 0$ (Eq. 11)

Equations (10) and (11) may be rewritten in the following form:

$\dot{W}_e = -2(\dot{R}/R)W_e + W_r W_t$ (Eq. 12)

$\dot{W}_t = -2(\dot{R}/R)W_t - W_r W_e$ (Eq. 13)

Multiplication of Eq. (12) by $W_e$ and Eq. (13) by $W_t$ results in the following equations:

$W_e \dot{W}_e = -2(\dot{R}/R)W_e{}^2 + W_e W_r W_t$ (Eq. 14)

$W_t \dot{W}_t = -2(\dot{R}/R)W_t{}^2 - W_e W_r W_t$ (Eq. 15)

The addition of Eq. (14) and Eq. (15) yields the equation 16:

$W_e \dot{W}_e + W_t \dot{W}_t = -2(\dot{R}/R)(W_e{}^2 + W_t{}^2)$ (Eq. 16)

The left hand side of Eq. (16) may be written as $W_e \dot{W}_e + W_t \dot{W}_t = \tfrac{1}{2}(d/dt)(W_e{}^2) + \tfrac{1}{2}(d/dt)(W_t{}^2) = \tfrac{1}{2}(d/dt)(W_e{}^2 + W_t{}^2)$ If we define $W^2 = W_e{}^2 + W_t{}^2$, then Eq. (16) may be rewritten as follows:

$W_e \dot{W}_e + W_t \dot{W}_t = \tfrac{1}{2}(d/dt)(W^2) = W\dot{W} = -2(\dot{R}/R)W^2$ (Eq. 17)

Eq. (17) may be simplified to:

$\dot{R}/R = \tfrac{1}{2}(\dot{W}/W)$ or $2\dot{R}W + R\dot{W} = 0$ (Eq. 18)

Differentiating Eq. (18) with respect to time yields:

$2\ddot{R}W + 3\dot{R}\dot{W} + R\ddot{W} = 0$ (Eq. 19)

It was shown in Eq. (9) that:

$\ddot{R} = (W_e{}^2 + W_t{}^2)R = W^2 R$

Substituting $W^2 R$ for $\ddot{R}$ in Eq. (19) yields:

$2W^3 R + \ddot{W}R + 3\dot{R}\dot{W} = 0$

This may also be written as follows:

$\dot{R}/R = -(2W^3 + \ddot{W})/3\dot{W}$ (Eq. 20)

Combining Eq. (18) with Eq. (20) eliminates the dependency upon R and $\dot{R}$.
The result is:

$-\tfrac{1}{2}\dot{W}/W = -(2W^3 + \ddot{W})/3\dot{W}$ or $\ddot{W} = (3/2)(\dot{W}^2/W) - 2W^3$ (Eq. 21)

Differential Equation 21 describes the angular motion of a constant velocity target. Rate orders for aided tracking may be generated by the solution of this equation independent of range.

The combined angular W, as defined previously, will be greater than zero except in the unusual instance when both $W_e$ and $W_t$ are simultaneously zero. Hence, the inverse of W will ordinarily be finite, a very desirable feature in generating Eq. (21). If the orthogonal components of W are generated separately, a singularity of this kind would be more likely to occur. Also, the instrumentation required to generate the components of W separately would be considerably more complex than that required to generate the combined angular rate W, from Eq. (21).

Figure 2:
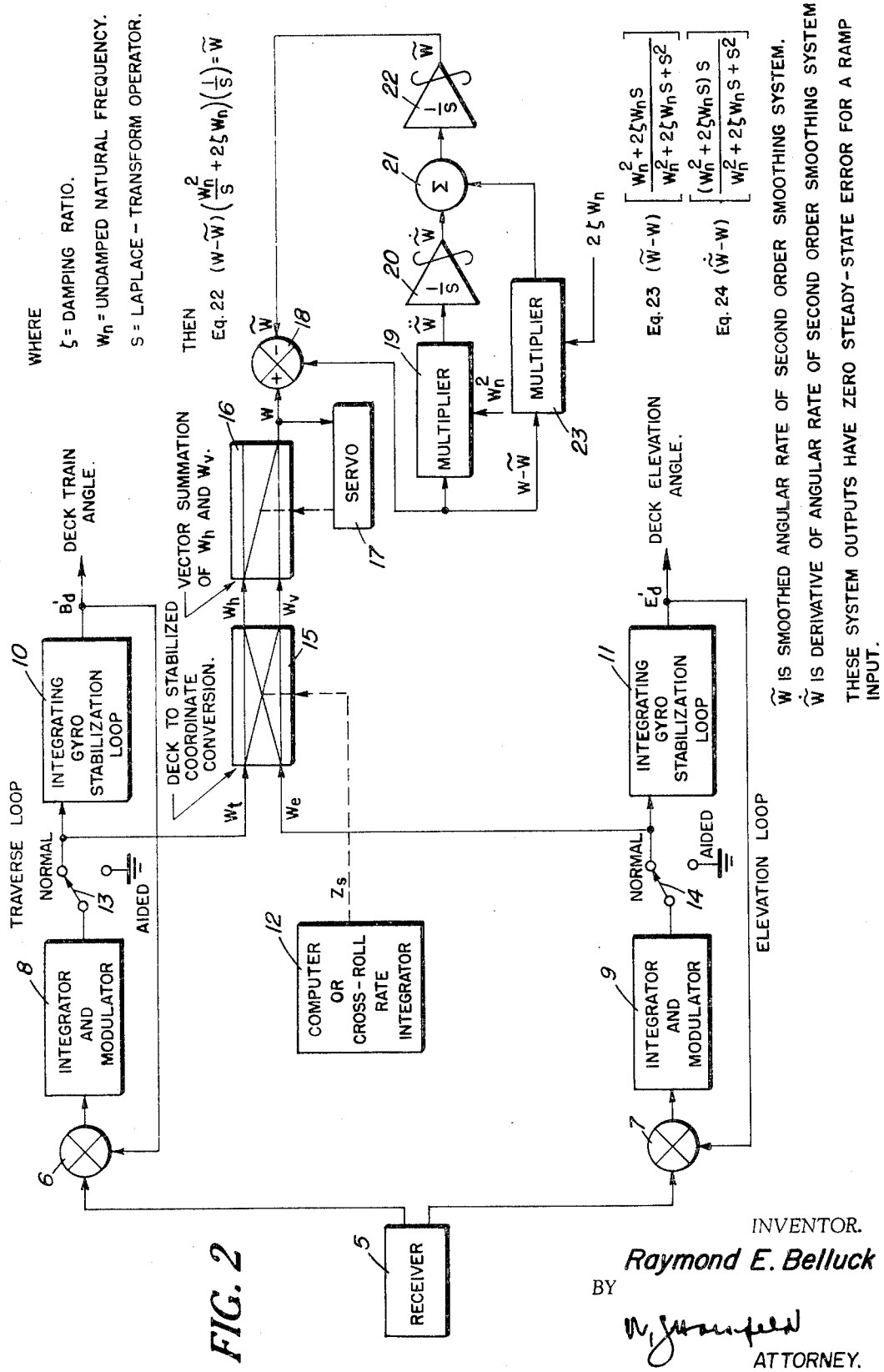
FIG. 2 shows a portion of the radar set including conventional elevation and traverse stabilization loops in combination with the aided angle tracking circuitry connected in the normal tracking mode.
Figure 3:
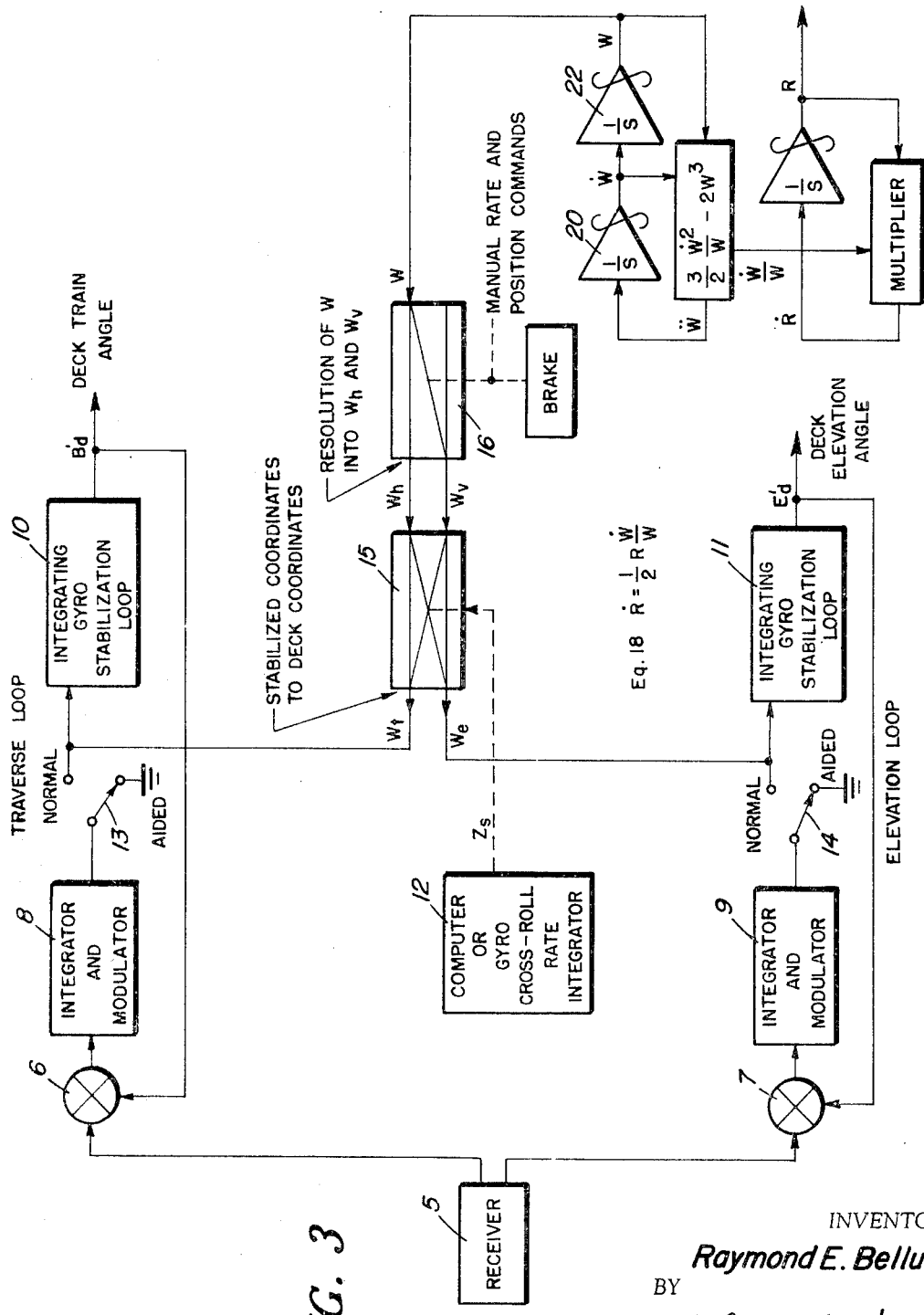
FIG. 3 illustrates the tracking radar set of FIG. 2 as it is controlled by the aided angle tracking computer of the present invention.

The proposed system operates in two distinct modes, namely the normal or passive track mode and the aided track mode. FIGS. 2 and 3 illustrate basically the block diagram representation of the system operated in the normal and aided tracking mode, respectively. FIG. 4 is a detailed representation of the system illustrated broadly in FIGS. 2 and 3 and will be discussed in detail with reference to the operation of both tracking modes.

Operating in the normal or passive track mode shown in FIg. 2 and with the contacts A, B, C, D and E positioned as shown in FIG. 4, the traverse and elevation servo loops, operating on signals received from the radar receiver 5, furnish the traverse and elevation angular rates $W_t$ and $W_e$ of the line of sight axes at the coordinate conversion circuitry 15. These rate signals are derived from the respective input angular acceleration command signals which are present within the traverse and elevation servo stabilization loops of the radar system at the output of 33 during normal tracking. Both the traverse and elevation servo loops include the conventional circuitry for operation as a second order system. The subtractor 33 provides an output error signal representing the angular acceleration command which is amplified in the d.c. operational amplifier 27 and applied as an input to modulator 28. The output of modulator 28 is in turn applied as an input to an integrating gyro 29 which acts to produce a turning motion (by means of servo motor 32) about its input axis at a rate corresponding to the angular velocity input command. Detector circuits in the receiver 5 measure errors in the antenna pointing direction of the radar and generate the above elevational and traverse error signals within the elevational and traverse loop respectively.

The antenna mount (not shown) is simultaneously driven by the output of the elevation loop in elevation at an angular rate corresponding to the turning rate of the gyro 29. A similar action takes place in the traverse loop, and in this case the integrating gyro input axis is aligned with the antenna traverse axis; angular velocity input command will produce a corresponding turning motion of the antenna mount (not shown) about its traverse axis. Each of the servo motors 32 produces the turning motion about the input axis of the two integrating gyros 29 at a rate corresponding to the angular velocity input command. This command will be available at the antenna mounts and is fed back to subtracter 33 in closed loop fashion to continuously reduce the error voltage at the output of subtracter 33.

In the aided track mode, the elevation and traverse loops are opened at point A and rate commands to the elevation and traverse integrating gyros are now derived from the aided angle tracking computer 24. The action of the elevation and traverse integrating gyros 29 is the same in the aided track mode as in the normal track mode.

During normal tracking the rate signals applied to the gyros 29 of the traverse and elevation servo stabilization loops of the radar control system are additionally fed to the coordinate conversion circuit 15 prior to jamming. In the coordinate conversion circuit 15 these traverse and elevation angular rates $W_t$ and $W_e$ are transformed to stabilized horizontal and vertical $W_h$ and $W_v$ by rotation of coordinates through $Z_s$, the cross traverse angle about the target line of sight and illustrated in FIG. 1.

Figure 4A:
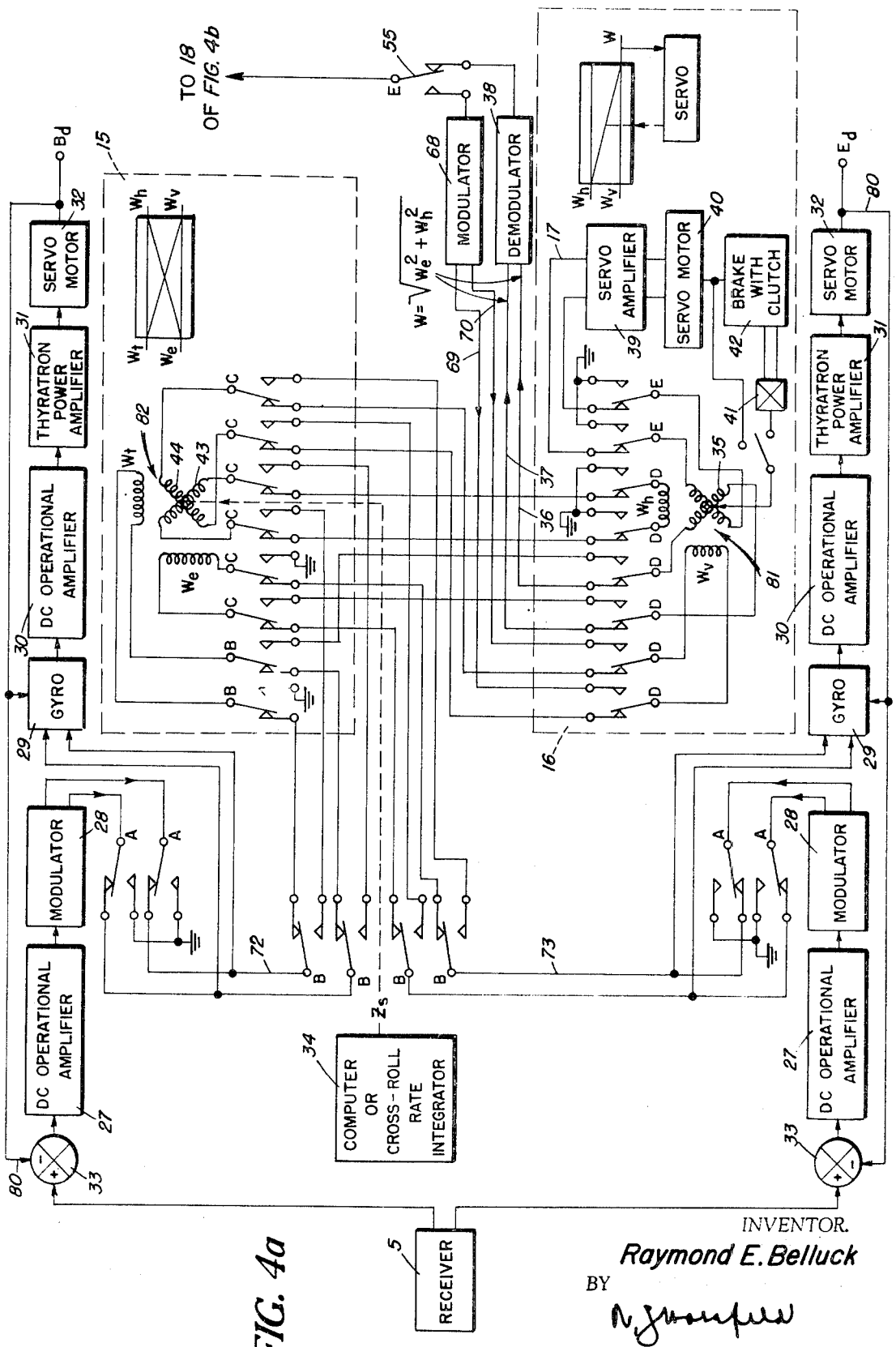
FIGS. 4a and 4b, area detailed schematic diagrams of FIGS. 2 and 3 illustrating how the tracking radar may be switched from a normal tracking mode to an aided tracking mode.
Figure 4B:
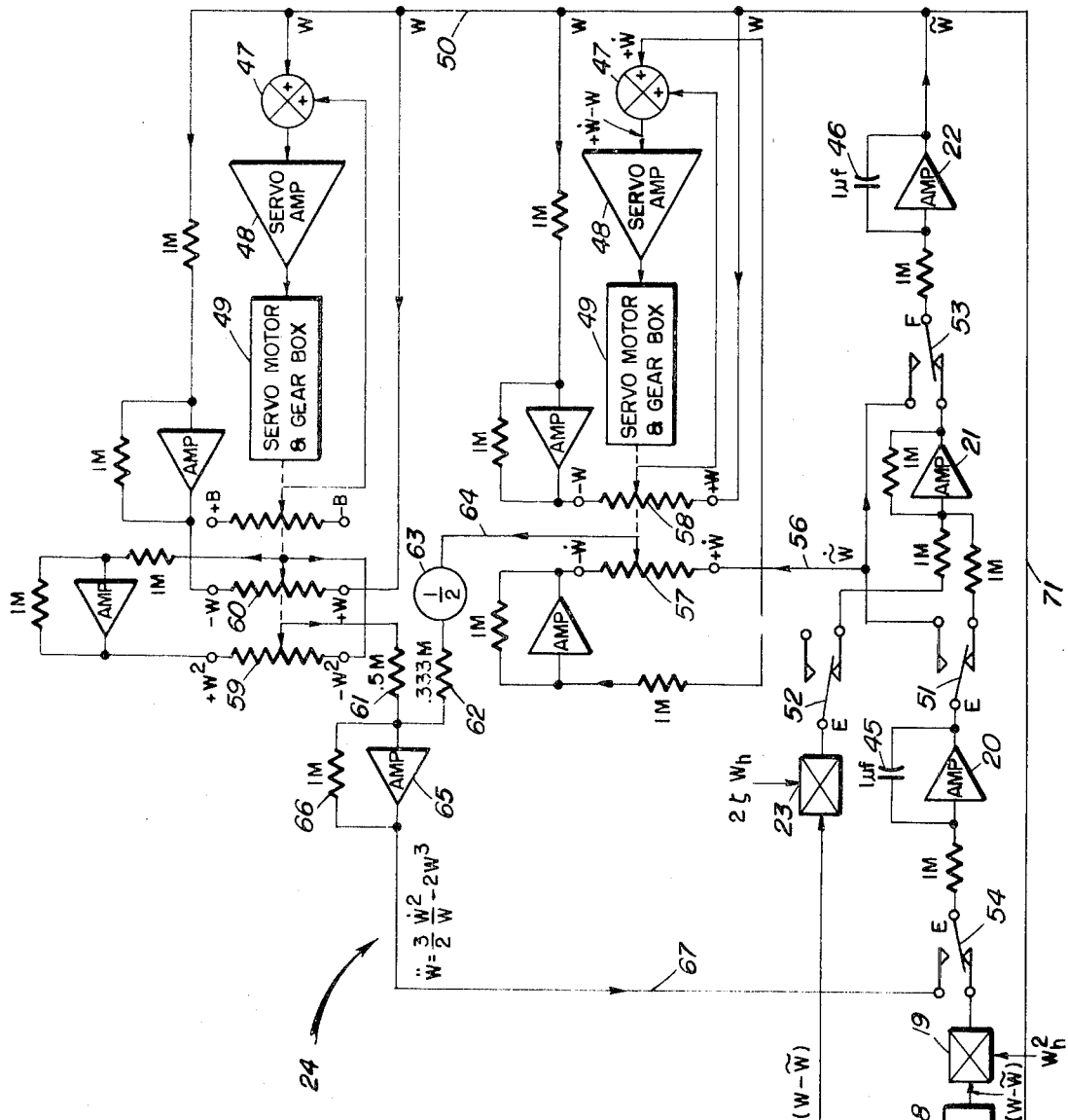

In FIG. 4a there is shown a pair of resolvers 81, 82 and a computer or traverse angle gyro 34 which provide the coordinate conversion in a conventional manner. A servo in the computer 34 may be turned in the quantity $Z_s$ so that the coordinate conversion means can either be linked to the servo by mechanical means such as a geared resolver or by syncro transmission. It would suffice to generate the incremental change in the quantity $Z_s$ with respect to some arbitrary initial value which is frozen prior to the start of the aided track mode. This change in $Z_s$ can be computed by integrating the cross traverse rate from a gyro mounted on the radar set in combination with the quantity $\dot{B}$ sine E (See FIG. 1) which would be computed in the computer 34. FIG. 4b shows a d.c. analog computation of the function generator circuitry and second order smoothing circuit 24. Alternately, an a.c. analog computer can be used for these computations.

The horizontal and vertical components $W_h$ and $W_v$ are summed vectorially at 16 and the output from the resolver winding 35 is fed along conductors 36 and 37 to the input of the demodulator 38. The output of the demodulator 38 is connected to the summer 18 in the normal track mode with switch E in the position as shown. The circuitry 16 providing for vector summation of $W_h$ and $W_v$ has associated therewith a servo control loop 17 which includes a servo amplifier 39, servo motor 40 and which may or may not include brake 42 and means 41 providing manual operation for control of the position of rotation of the resolver windings 35.

It is important to emphasize that horizontal and vertical angular rates $W_h$ and $W_v$ are only intermediate steps in the computation of $W_t$ and $W_e$ in the aided track mode. These angular rates $W_h$ and $W_v$ are convenient because the cross traverse angle, $Z_s$, is available, but it is also possible to use another set of coordinates as an intermediate conversion step. For example, if a gyro cross roll rate signal was available, a coordinate rotation through the integral of this quantity would achieve equivalent results.

In the analog circuitry 24, two integrators 20 and 22 are shown. These integrators, using operational amplifiers, resistors and capicitors, are appropriate for a d.c. analog system. The initial conditions for these integrators are established by storing the last known angular acceleration and velocity data obtained during normal tracking in the d.c. system shown in FIG. 4b, the initial values are stored by charging the integrating capacitors 45 and 46. It is desired during normal tracking to generate the function W which is the smoothed angular rate of the second order smoothing system at the output of the integrating amplifier 22. $\dot{W}$ is the derivative of the smoothed angular rate of the second order smoothing system at the output of integrating amplifier 20 and this system output has a zero steady state error for a ramp input. $\zeta$ is the damping ratio of the system and $W_n$ is the undamped natural angular rate received prior to jamming.

The quantities W and $\tilde{W}$ are related in the following equations:

$$(W - \tilde{W})\ [(W_n^2/S) + 2\zeta\ W_n]\ [1/S] = \tilde{W}$$

(Eq. 22)

$$\tilde{W} = W\ [W_n^2 + 2\zeta\ W_n S / W_n^2 + 2\zeta\ W_n S + S^2]$$

(Eq. 23)

$$\tilde{\dot{W}} = W\ [(W_n^2 + 2\zeta\ W_n S)S / W_n^2 + 2\zeta\ W_n S + S^2]$$

(Eq. 24)

During normal tracking the undamped natural angular rate $W_n$ is squared and fed to the multiplier 19. The quantity $2\zeta\ W_n$ is fed from an external source to the multiplier 23 and each of these multipliers receive the output from the summer 18 which is the quantity $(W - \dot{W})$. The output $\dot{W}$ at the output of integrating amplifier 22 is the product of the three quantities shown in equation 22. It is believed that without further explanation the operation of this portion of the computer circuitry should be obvious to one skilled in the art.

When normal or passive tracking ceases, the system is switched into the aided angle track mode with switches at points A through E in their uppermost position as shown in FIG. 4. The solution to the equation of constant velocity target motion, $$\ddot{W} = (3/2)\ \dot{W}^2/W - 2W^3 \qquad \text{(Eq. 21)}$$

is generated by the circuit 24 This function generator utilizes the two integrators 20 and 22 of the second order smoothing circuit above-described and the values of $\dot{W}$ and $W$ which are stored in these integrators when aided track begins are the initial conditions required to solve Equation 21. $\dot{W}$ is fed via conductor 56 and applied to potentiometer 57 and the input of the adder 47 of the servo mechanism. The servo mechanism additionally includes the servo amplifier 48 and the servo motor and gear box 49. A similar servo mechanism assembly is connected via conductor 50 and includes adder 47, servo amplifier 48 and servo motor and gear box 49 connected in a conventional fashion with follow-up potentiometers 59 and 60 to perform the multiplication function resulting in $W^3$. The multiplier circuitry including the servo mechanism assemblies and follow-up potentiometers above-described is well known in the art.

The output function of $\dot{W}^2/W$ is taken from output potentiometer 57 and fed through divider 63 and the 0.333 megohm resistor 62 into summing amplifier 65. The function of $W^3$ is applied across the 0.5 megohm resistor 61 and likewise to the summing amplifier 65. Thus since the feedback resistor 66 is one megohm, the resultant output function $$\ddot{W} = 3/2\ \dot{W}^2/W - 2W^3.$$

Thus with Equation 21 satisfied, the value $W$ is fed via connector 71 through the summer 18 and into the modulator 68. The summer at this point is inoperative to effect a change in $W$ since multipliers 19 and 23 are disconnected.

During the manual aided angle track mode, the angle $\theta = \arctan W_h/W_v$ is held fixed at the value last established prior to entering the aided track mode. The angular rate $W$, which is computed in the function generator during this mode, is resolved through the angle $\theta$ into the horizontal and vertical components of angular rates, $W_h$ and $W_v$, by the application of the modulate output signal at conductors 69 and 70 to the resolver circuitry 81. These stable horizontal and vertical angular rates are then transformed into the deck-oriented lateral and vertical angular rates, $W_t$ and $W_e$, by a rotation of the coordinate system through the cross traverse angle $Z_t$ in the resolver 82. The angular rates of $W_t$ and $W_e$ are then introduced as rate commands into the corresponding traverse and elevation stabilization loops via conductors 72 and 73 and applied as inputs to the gyro 29. The radar will now move in accordance with these ordered rates.

The angular rates provided by the aided tracking circuits may be modified at the discretion of the radar operator by varying the mechanical positions or rate input at multiplier 41. Manual rate and position control incorporated into the circuits allows the operator to modify the angular rate $W$ which is the output of the function generator, and the angle $\theta$ which is the angle that resolves $W$ into the horizontal and vertical components $W_h$ and $W_v$.

When $\theta$ is held fixed, the transformation of $W$ into its horizontal and vertical components $W_h$ and $W_v$ is not exact. This would of course be due to the variation in the roll of the ship and would vary as $Z_t$ varies as is clear in FIG. 1. This transformation can be made exact, however, by allowing $\theta$ to change as $W$ sine $\theta$ tan E changes. ($\dot{\theta} = W$ sine $\theta$ tan E). The angle $\theta$ should only be varied in this way when the components of $W$ undergo a coordinate rotation through $Z_s$, the cross traverse angle. If the coordinate rotation is through the integral of the gyro cross roll rate instead of through $Z_s$, the transformation through a fixed angle $\theta$ is exact.

Various modifications are contemplated and may obviously be resorted to by those skilled in the art without departing from the spirit and scope of the invention. For example, an a.c. analog system, may be employed using electro-mechanical integrators and a tachometer geared to a motor. Such a system would provide a signal proportional to a turning rate which could be subtracted from the input function. This difference signal may be amplified and applied to the motor to cause the motor to turn at a rate corresponding to the input function. In the a.c. system initial values are represented by the initial positions of the integrating servos. It is therefore to be understood that within the scope of the appended claims the invention may be practiced otherwise than as specifically described.

I claim:

1. A method of tracking a moving target in the presence of enemy jamming by controlling the angular motion of a radar tractor comprising the steps of deriving an angular velocity signal $W$ representative of target angular velocity with respect to said tracker immediately prior to enemy jamming, storing said angular velocity signal and the first time derivative thereof in an integrating circuit prior to enemy jamming, applying signals from said integrating circuit to a function generator during enemy jamming of said tracker, generating in said function generator the second time derivative $\ddot{W}$ of the derived angular velocity signal $W$ which satisfies the equation $$\ddot{W} = 3/2\ (\dot{W}^2/W) - 2W^3$$

where $\dot{W}$ represents the first time derviative of said angular velocity signal $W$ and applying an angular velocity signal $W$ which satisfies the equation $$\ddot{W} = 3/2\ (\dot{W}^2/W) - 2W^3$$

to control circuitry coupled to said radar tracker for causing said radar tracker to track at said last-named angular velocity.

2. A method of tracking a target in the presence of enemy jamming which employs a radar tracker and comprises the steps of deriving from a radar receiver traverse and elevation components of an angular velocity signal representative of said target angular velocity with respect to said tracker immediately prior to enemy jamming of said tracker, applying said traverse and elevational components to a coordinate conversion means for converting said components into stabilized horizontal and vertical components of said angular velocity signal, vectorially summing said horizontal and vertical components, storing the vectorial sum and the time derivative thereof of said horizontal and vertical components in an integrating circuit, applying signals from said integrating circuit to a function generator for generating an angular rate signal W which satisfies the equation $$\ddot{W} = 3/2\ (\dot{W}^2 W) - 2W^3$$

where $\ddot{W}$ represents the second time derivative of W and $\dot{W}$ represents the first time derivative of W and applying said last-named signal to circuitry coupled to said radar tracker enabling said tracker to track at said last-named angular rate during enemy jamming.

3. The method of claim 2 wherein the application of said last-named signal to circuitry coupled to said radar tracker includes further the steps of resolving said signal into stabilized horizontal and vertical components, converting said components into traverse and elevational components by rotating said horizontal and vertical components through an angle $\theta$, and applying said traverse and elevational components to said radar tracker.

4. An electrical system connected to receive angular velocity signals of the line of sight axis between a radar tracker on a ship and a moving target comprising a radar receiver, a first stabilization servo loop interconnecting said receiver and said radar tracker for providing a target elevation control signal at said tracker during normal tracking, a second stabilization servo loop interconnecting said receiver and said radar tracker for providing a target bearing control signal at said tracker during normal tracking, coordinate conversion means connected to each of said stabilization loops for converting deck-oriented elevational and traverse angular velocity signal components within said first and second stabilization servo loops respectively into stabilized vertical and horizontal angular velocity component signals means coupled to said coordinate conversion means for deriving the vector sum of said horizontal and vertical angular velocity signal components, an integrating circuit connected to said last-named means for storage therein said vector sum and a time derivative thereof, a function generator coupled to said integrating circuit for generating an angular velocity signal W which satisfies the equation $$\ddot{W} = 3/2\ (\dot{W}^2/W) - 2W^3$$

wherein $\ddot{W}$ and $\dot{W}$ represent respectively the second and first time derivatives of said angular velocity signal W, said last-named signal being applied through said means for deriving and said coordinate conversion means for enabling said traverse and elevation stabilization servo loops to receive traverse and elevation components of the angular velocity signal of the line of sight axis between said radar tracker and said moving target when said target is moving in a constant velocity in a line away from said ship.

5. A method of controlling the angular motion of a radar tracker while tracking a moving target during enemy jamming at the tracker which comprises the steps of deriving traverse and elevational components of the angular velocity signal of the line of sight axis between said radar tracker and said moving target, converting said traverse and elevational components into stabilized horizontal and vertical components of said angular velocity signal, summing said horizontal and vertical components vectorially, storing the vectorial sum of said last-named components in an integrating circuit applying signals from said integrating circuit to a function generator for generating an angular velocity signal of the line of sight axis between said radar tracker and said moving target when said target is moving in a constant velocity away from said tracker, and applying said last-named signal to control circuitry coupled to said tracker for control thereof during enemy jamming.

6. A method of controlling a radar tracker during enemy jamming comprising the steps of deriving an angular velocity signal W representative of a target's angular velocity with respect to the tracker immediately prior to enemy jamming, storing said angular velocity signal W in a function generating means and thereafter generating in said function generating means an angular velocity signal W satisfying the equation $$\ddot{W} = 3/2\ (\dot{W}^2/W) - 2W^3$$

wherein $\ddot{W}$ represents the second time derivative of the angular velocity signal W and $\dot{W}$ represents the first time derivative of the angular velocity signal W and applying said last-named angular velocity signal W to said radar tracker for control thereof during enemy jamming.

7. An electrical system connectable to a radar tracker for receiving angular velocity signals of the line of sight axis from the tracker to a moving target comprising conductive means connected to said tracker, intergrating means connected to said conductive means for storing an angular velocity signal and a time derivative of said angular velocity signal representative of the angular velocity of said line of sight axis immediately prior to enemy jamming at said tracker and a function generator coupled to said integrating means responsive to signals from said integrating means for generating an angular velocity signal W which satisfies the equation $$\ddot{W} = (3/2)\ (\dot{W}^2/W) - 2W^3$$

wherein $\ddot{W}$ and $\dot{W}$ represent respectively the second and first time derivatives of said angular velocity signal W, whereby said last-named signal may be applied to said tracker for control thereof during enemy jamming.

8. A method of controlling the angular motion of a radar tracker while tracking a moving target during enemy jamming at the tracker which comprises the steps of deriving traverse and elevational components of the angular velocity signal of the line of sight axis between said radar tracker and said moving target, converting said traverse and elevational components into stabilized horizontal and vertical components of said angular velocity signal, summing said horizontal and vertical components vectorially, storing the vectorial sum of said last-named components in an integrating circuit applying signals from said integrating circuit to a function generator for generating an angular velocity signal of the line of sight axis between said radar tracker and said moving target when said target is moving in a constant velocity away from said tracker, resolving said angular velocity signal into its horizontal and vertical components, converting said horizontal and vertical components into traverse and elevational components and applying said traverse and elevational components to said tracker for separately controlling the elevation and bearing at said tracker.

* * * * *